(12) United States Patent
Jimenez Cruz et al.

(10) Patent No.: US 11,896,954 B2
(45) Date of Patent: Feb. 13, 2024

(54) MICROPOROUS CARBON MATERIALS TO SEPARATE NITROGEN IN ASSOCIATED AND NON-ASSOCIATED NATURAL GAS STREAMS

(71) Applicant: INSTITUTO MEXICANO DEL PETROLEO, Mexico City (MX)

(72) Inventors: Federico Jesus Jimenez Cruz, Mexico City (MX); Jose Luis Garcia Gutierrez, Mexico City (MX); Jose Francisco Gaspar Silva Sanchez, Mexico City (MX); Liliana Alejandra Astudillo Lopez Lena, Mexico City (MX); Fidencio Hernandez Perez, Mexico City (MX); Alberto Cabrales Torres, Mexico City (MX); Maria Del Carmen Martinez Guerrero, Mexico City (MX); Marco Antonio Dominguez Aguilar, Mexico City (MX); Arturo Trejo Rodriguez, Mexico City (MX); Florentino Rafael Murrieta Guevara, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 156 days.

(21) Appl. No.: 17/350,468

(22) Filed: Jun. 17, 2021

(65) Prior Publication Data
US 2021/0308652 A1   Oct. 7, 2021

Related U.S. Application Data

(62) Division of application No. 16/146,502, filed on Sep. 28, 2018, now Pat. No. 11,059,027.

(30) Foreign Application Priority Data

Sep. 29, 2017 (MX) .......................... a/2017/012563

(51) Int. Cl.
| | | |
|---|---|---|
| *B01J 20/285* | (2006.01) | |
| *B01D 53/02* | (2006.01) | |
| *B01J 20/20* | (2006.01) | |
| *B01J 20/28* | (2006.01) | |
| *B01J 20/30* | (2006.01) | |

(52) U.S. Cl.
CPC ............ *B01J 20/285* (2013.01); *B01D 53/02* (2013.01); *B01D 53/025* (2013.01); *B01J 20/20* (2013.01); *B01J 20/2808* (2013.01); *B01J 20/28021* (2013.01); *B01J 20/3078* (2013.01); *B01J 20/3085* (2013.01); *B01D 2253/102* (2013.01); *B01D 2256/10* (2013.01);
(Continued)

(58) Field of Classification Search
CPC .................. B01J 20/3085; B01J 20/285; B01J 20/28021; B01J 20/2808; B01J 20/20; B01D 53/02; B01D 53/025; B01D 2253/102; B01D 2256/10; B01D 2257/504; B01D 2257/7025
See application file for complete search history.

(56) References Cited

U.S. PATENT DOCUMENTS

| | | | |
|---|---|---|---|
| 3,516,791 A | * | 6/1970 | Evans ..................... C01B 32/00 423/330.1 |
| 3,852,429 A | | 12/1974 | Murayama |

OTHER PUBLICATIONS

Lee, Seul-Yi et al., "Carbon dioxide adsorption Performance of ultramicroporous carbon derived from poly(vinylidene fluoride)", 2014, Journal of Analytical and Applied Pyrolysis 106, pp. 147-151 (Year: 2014).

\* cited by examiner

*Primary Examiner* — Robert Clemente
(74) *Attorney, Agent, or Firm* — FisherBroyles, LLP; Jason P. Mueller

(57) ABSTRACT

The present invention relates to a process for the manufacture of microporous carbon materials to perform selective separations of nitrogen in gas mixtures such as hydrogen sulfide, carbon dioxide, methane and $C_2$, $C_3$ and $C_4^+$ hydrocarbons, with high efficiency, shaped of microspheres or cylinders from copolymers of poly (vinylidene chloride-co-methyl acrylate) with density of 1.3 to 1.85 g/cm$^3$ or poly (vinylidene chloride-co-vinyl chloride) with density of 1.3 to 1.85 g/cm$^3$, using two stages. The first stage consists of a surface passivation of the material by chemical attack in a highly alkaline alcohol solution, with the aim of effecting a precarbonization on the surface of the copolymer that during the pyrolysis process is not deformed and gradually develops microporosity. The material of the first stage presents, in the layer, percentages between 55% to 85% carbon, between 5% to 20% oxygen, and between 10% to 40% chlorine. The interior of the material presents lower percentages of carbon, between 30% to 65%, oxygen in the amount of between 2% to 6%, and chlorine in the amount of between 30% to 60%. The second stage consists of the gradual pyrolysis of the passivated copolymer, with the aim of developing microporosity and high surface area values; as well as during the melting and gas dehydrohalogenation stages thereof, the deformation of the material is avoided. The morphology of the copolymers are microspheres of 125 to 225 micrometers, or cylinders of 4 mm in height and 3 mm in diameter, which after pyrolysis reduce its size by 35% with respect to the initial one. The material of the second stage, which is already microporous carbon material, presents in the layer percentages between 90% to 100% carbon and between 10% to 0% oxygen.

21 Claims, 8 Drawing Sheets

(52) U.S. Cl.
CPC .. *B01D 2257/304* (2013.01); *B01D 2257/504* (2013.01); *B01D 2257/7025* (2013.01)

MICROPOROUS CARBON MATERIALS TO SEPARATE NITROGEN IN ASSOCIATED AND NON-ASSOCIATED NATURAL GAS STREAMS

This patent application is a divisional of U.S. patent application Ser. No. 16/146,502, which in turn claims priority under 35 U.S.C. § 119 to Mexican Patent Application MX/A/2017/012563, filed on Sep. 29, 2017, the disclosures of which are incorporated herein by reference in their entireties.

TECHNICAL FIELD OF THE INVENTION

The present invention relates to a process for the manufacture of microporous carbon materials to perform selective separations of nitrogen in gas mixtures such as hydrogen sulfide, carbon dioxide, methane and $C_2$, $C_3$ and $C_4^+$ hydrocarbons, with high efficiency, in the form of microspheres from copolymers of poly (vinylidene chloride-co-methyl acrylate) with a density of 1.3 to 1.85 $g/cm^3$ or poly (vinylidene chloride-co-vinyl chloride) with a density of 1.3 to 1.85 $g/cm^3$, using two stages. The first stage consists of a surface passivation of the material by chemical attack in a highly alkaline alcohol solution with the aim of effecting a precarbonization on the surface of the copolymer, so that during the pyrolysis process it is not deformed, and gradually develops the microporosity. The material of the first stage presents in the layer percentages between 55% to 85% carbon, between 5% to 20% oxygen, and 10% to 40% chlorine, while the interior of the material presents lower percentages of carbon, between 30% to 65%, and percentages of oxygen between 2% to 6% and of chlorine between 30% to 60%. The second stage consists of the gradual pyrolysis of the passivated copolymer with the aim of developing microporosity and high surface area values; wherein during the melting and the dehydrohalogenation of the passivated copolymer they prevent deformation of the material. According to the characterization by means of scanning electron microscopy (SEM), the morphology of the copolymers are microspheres of 125 to 225 micrometers, or cylinders of 4 mm of height and 3 mm of diameter, which after pyrolysis reduces its size by 35% as compared to the initial one. The material of the second stage, which is already microporous carbon material, presents in the layer percentages between 90% to 100% carbon and between 10% to 0% oxygen.

This microporous carbon material presents the highly feasible quality of the chromatographic separation of nitrogen in mixtures with gases such as hydrogen sulfide, carbon dioxide, methane and $C_2$, $C_3$ and $C_4^+$ hydrocarbons, which allows it to take it as a base to develop technologies for the separation of these components through adsorption-desorption processes.

Background of the Invention

Activated carbon with microporous characteristics is very useful for selective separations in the gas phase of hydrocarbons, oxygen, nitrogen, removal of hydrogen sulfide and carbon dioxide, benzene, as well as in gas purification systems. One kind of these materials are carbon molecular sieves (CMS), which have characteristics such as a pore distribution of 0.3 to 1.5 nm and highly selective adsorption of small diameter molecules.

It is desirable to have materials with selective separation properties whose regeneration and reuse is substantial, with microporous carbon being an ideal candidate. The properties of microporous carbon are also linked to a uniform distribution in particle size and shape. The process of preparation of materials with these properties is classified into: a) Pyrolysis of organic and polymeric materials and b) Chemical activation methods.

According to the state of the art, in the work called "Adsorption on Saran charcoal. A new type of molecular sieve" in Trans. Faraday Soc., Vol. 50, p. 740-8 (1954), Dacey and Thomas describe the preparation of a hard and highly porous carbon from the vacuum pyrolysis of polyvinylidene chloride tablets, first at 180° C. for several hours and then at 700° C. Adsorption isotherms were determined for water, helium, n-pentane and nitrogen, and the adsorption rates for various hydrocarbons were studied. Large, bulky molecules adsorbed very slowly, while linear and flat molecules adsorbed rapidly.

Tager et al., in "Formation of microporous structure in the thermal degradation of Saran", Dokl. Akad. Nauk SSSR, vol 144, p. 602-5 (1962), present the calcination study of the Saran copolymer formed by 85% mass of vinylidene polychloride and 15% mass of polyvinyl chloride in a quartz tube at various temperatures. Adsorption isotherms for nitrogen and benzene were determined. The product of Saran's thermal decomposition presents typical adsorption isotherms of small pores and exhibits molecular sieve properties. In the calcined Saran, only the carbon skeleton remains, and the micropores substantially increase in size in the final state of thermal decomposition. The volume of micropores per unit mass in the state of thermal decomposition is related to the amount of hydrochloric acid that is released.

In Japanese Patent JP 50,161,485 (1975) and in the works entitled "The removal of oxygen from air by pressure swing adsorption with a carbonaceous adsorbent made from Saran waste", Nippon Kagaku Kaishi, no. 12, p. 1894-7 (1980) and "Preparation of molecular sieving carbon from Saran waste: Separation of air by pressure swing adsorption", Kogai, vol. 16 (3), p. 153-61 (1981), Kitagawa et al., the preparation of carbon molecular sieves for the separation of oxygen and nitrogen mixtures from Saran waste is presented. The structure of the pore and the adsorption characteristics of the carbon molecular sieves obtained were comparable to those of the zeolites. The molecular sieve with the best characteristics for the separation of the oxygen and nitrogen mixtures was prepared from a mixture 81.8% mass of Saran carbon and 9.1% mass of microcrystalline cellulose as binder.

U.S. Pat. No. 3,960,768 (1976) describes the production of an abrasion-resistant carbon molecular sieve from an alkylidene halide polymerized by a two-stage thermal process, in such a way that the first stage of decomposition is carried out at a temperature range between 140 to 250° C., releasing a specific amount of hydrogen chloride (between 5% and 50% mass). The product obtained is described as suitable as a stationary phase for chromatographic separations and analysis of mixtures.

U.S. Pat. No. 4,046,709 (1977) describes the preparation of a carbon molecular sieve for the adsorption of carbon dioxide that does not require activation and is obtained from a copolymer of polyvinylidene polychloride, subjected to thermal treatment for the removal of the hydrogen chloride, with subsequent pulverization of the product at a particle size less than 100 mesh, addition of 15 to 35 parts by mass of a sintering carbonaceous agent and from 8 to 15 parts by mass of an organic type binder pelletizer. The product obtained is heat treated, pulverized and extruded again. The obtained tablets are carbonized for 2 h at 600° C.

The description of the effect of the calcination temperature and the rate of the same in the preparation of some molecular sieves from a mixture composed of 69.4 parts by mass of carbon obtained by the calcination of Saran at 600-900° C., 23.1 parts by mass of coal tar pitch, and the remainder by microcrystalline cellulose, is described in the work of Yuki et al. in Nenryo Kyokaishi, vol. 60 (649), p. 354-9 (1981). As a result of the studies carried out with this prepared material, the adsorption volumes of the compounds studied follow the order: $CO_2$, $CH_4$, $C_2H_4$, $C_3H_6 > C_3H_8 > C_4H_{10} \gg$ iso-butane=neo-pentane, while Saran carbonization itself does not present this property. In this work it is concluded that the conditions of preparation of the material affect the pore size of the final product. These materials exhibit molecular sieve properties similar to 5 Å zeolite to separate butane from iso-butane, but differ in the separation of cyclohexane from hexane, which indicates that they have slit pores.

Patent JP 57,042,514 (1982) describes the production of a carbon molecular sieve from Saran residues that is used to obtain nitrogen from air by eliminating oxygen. The first step involves the removal of hydrochloric acid by temperature for the formation of carbon. This powder is mixed with 10% to 15% by mass of an organic binder (e.g. tar or pitch) and with 10% to 15% by mass of an organic material, such as microcrystalline cellulose, and then is granulated and carbonized at 850-1000° C. for 0.5-1.5 h and at a heating rate of 5-7° C./min.

In the work of Kitagawa et al. called "Preparation of molecular sieves carbon from Saran waste. Separation of hydrocarbons by a fixed bed adsorber", Kogai, vol. 18 (2), p. 109-18 (1983), the dynamic characteristics of adsorption are studied for several carbon molecular sieves, for mixtures of butane with iso-butane, 1-butene with iso-butene and benzene with cyclohexane, in a fixed bed. These sieves presented excellent capacity to separate iso-butane from butane, although their capacity to separate 1-butene from iso-butene is inferior to that of 5 Å zeolite. Likewise, the carbon molecular sieve prepared from Saran at calcination temperatures of 800° C. is the most suitable for the separation of benzene from cyclohexane.

In the study called "Changes in the adsorption capacity of Saran carbons for some hydrocarbons by gas chromatography" described in Ext. Abstr. Program Binn. Conf. Carbon 16th, p. 317-8 (1983), Fernandez-Morales et al. conclude that the adsorption capacities of activated carbon obtained by pyrolysis of the vinylidene chloride-vinyl chloride copolymer, commercially known as Saran 872, for the separation of hydrocarbons at high temperatures, increases as the pyrolysis temperature increases up to 1100° C. and decreases at 1300° C. This effect is especially strong for cyclohexane, as demonstrated by its separation from benzene. This effect is attributed to the blocking of pores that gives rise to slit-type pores that act as a molecular sieve.

Fernandez-Morales et al., in "Adsorption capacity of Saran carbons at high temperatures and under dynamic conditions", Carbon, vol. 22 (3), p. 301-4 (1984), exposes the preparation of several carbons activated from carbonization of Saran 872 at different temperatures. The adsorption capacity of these carbon materials was studied by a gas chromatography method. All these materials have a pore size less than 0.62 nm. In the carbon material obtained at 1300° C., in a helium atmosphere, slits are observed as a molecular sieve for the cyclohexane. By moderate gasification, these pores are opened so that the molecular sieve properties are lost.

Another alternative for the preparation of carbon molecular sieve is to use a chemical method as an option to pyrolysis, as described by Barton et al. in "Thermal and chemical dehydrohalogenation of Saran Powder" Amer. Chem. Soc. Plast. Chem. Pap., Vol. 31, p. 177-88 (1971), in which the preparation of carbons is shown by treating the Saran copolymer with a solution of potassium hydroxide in iso-propanol. In the document they describe that the pores in the carbons obtained by chemical degradation are smaller with respect to those obtained with direct pyrolysis.

In Barton et al. "Molecular sieve properties of the carbonaceous products by chemical dehydrohalogenation of polyvinylidene chloride" J. Chem. Soc. Faraday., Vol 68, p. 1647-55 (1972), it was found that the carbons prepared by chemical dehydrohalogenation present pores of 0.4 to 0.5 nm, which ensures an efficient separation of branched hydrocarbons from the linear ones. Using longer reaction times, carbon materials with pores of 3 Å are obtained.

The last two bibliographical references describe the use of other chemical agents for degradation, such as sodium or potassium amide in liquid ammonia (U.S. Pat. No. 3,516,791, 1970), and lithium, sodium, or potassium hydroxides with different alcohols. In water, the attack is practically null.

In Evans et al. "The production of chemically-activated carbon", Carbon, vol. 37, p. 269-74 (1999), carbons of high microporosity were prepared in which the copolymer reacted directly with potassium hydroxide under a nitrogen atmosphere.

In the U.S. Pat. No. 3,817,874 (1972), high porosity carbons are obtained by treatment of granular activated carbon with alcoholic potassium at 20% mass; and in U.S. Pat. No. 3,764,561 (1971), coke charcoal is treated with inorganic potassium and sodium salts followed by carbonization at 600° C.

U.S. Pat. No. 3,852,429 (1973) describes a process for preparing carbons with defined shape (spheres, cylinders, tubes) from vinylidene polyfluoride subjected to a hybrid process of chemical treatment with sodium amide in liquid ammonia and subsequent pyrolysis of the chemically treated material.

Regarding the capacity of separation of nitrogen, in "Effects of structure and surface property on adsorptive separation of carbon molecular sieve for $CH_4/N_2$ and $CO_2/N_2$. Journal of Functional Materials, vol. 43 (20), p. 2858-62 (2012), Zhang et al. studied the structural and surface effects of carbon molecular sieves for the separation by adsorption of the mixtures $CH_4/N_2$ and $CO_2/N_2$; the adsorption isotherms were measured by the use of the high accuracy intelligent gravimetric analyzer, studying the adsorption separation equilibrium of the adsorbents. The establishment of the adsorption kinetics of $N_2$, $CH_4$ and $CO_2$ characterizes the pore size distribution of carbon molecular sieves. The experimental results showed that some of these sieves are viable for the dynamic separation for the $CH_4/N_2$ and the separation equilibrium of $CO_2/N_2$. The effect of separation equilibrium for $CH_4/N_2$ and $CO_2/N_2$ was better than dynamic separation. Pore size was the key factor affecting the separation by adsorption of carbon molecular sieves. The difference in pore diameter distribution caused even more steric hindrance of dynamic separation for the $CH_4/N_2$ in some of the sieves, as well as the effect of separation equilibrium in other sieves. The functional group of oxygen favored the separation by own adsorption of the molecular sieves of carbon.

In "Nanoporous carbons as promising novel methane adsorbents for natural gas technology", Journal of Natural Gas Chemistry, vol. 20 (6), p. 664-8 (2011), Rashidi et al. report the synthesis of nanoporous carbon materials as methane adsorbents for natural gas technology, wherein nanoporous carbons were synthesized using furfuryl alcohol and sucrose as precursors and MCM-41 and mordenite as nanoporous templates. The nanoporous carbons produced were used as an adsorbent for the storage of methane. The average pore diameters of the samples ranged from 3.9 to 5.9 nm and the surface area by the Brunauer-Emmett-Teller method (BET) ranged from 320 to 824 m$^2$/g. The volumetric adsorption experiments revealed that MCM-41 and sucrose had a better performance compared to mordenite and furfuryl alcohol, respectively. In addition, the effect of the precursor to the proportion of template in the nanoporous carbon structure and its adsorption capacities was investigated. The nanoporous carbon produced from mesoporous molecular sieve MCM-41 partially filled with sucrose shows the best methane adsorption capacity of the samples analyzed.

It is evident from the above that there are still no microporous carbon materials that can efficiently separate by adsorption to the typical components of associated and non-associated natural gas ($N_2$, $CH_4$, $CO_2$ and $H_2S$). It is therefore an object of the present invention to show a process for the manufacture of microporous carbon material that presents in the layer percentages between 90% to 100% carbon and between 10% to 0% oxygen to perform selective separations of nitrogen in mixtures of gases, such as hydrogen sulfide, carbon dioxide, methane and $C_2$, $C_3$ and $C_4^+$ hydrocarbons, with high efficiency, in the form of microspheres or cylinders from copolymers of poly (vinylidene chloride-co-methyl acrylate), with density from 1.3 to 1.85 g/cm$^3$, or poly (vinylidene chloride-co-vinyl chloride), with a density of 1.3 to 1.85 g/cm$^3$, using the two steps described above.

The present invention describes the manufacture of microporous carbon material comprising two stages. The first stage consists of a surface passivation of the material by chemical attack in a highly alkaline alcohol solution, with the aim of effecting a precarbonization on the surface of the copolymer that during the pyrolysis process is not deformed and gradually develops microporosity. The material of the first stage presents, in the layer, percentages between 55% to 85% carbon, between 5% to 20% oxygen, and between 10% to 40% chlorine. The interior of the material presents lower percentages of carbon, between 30% to 65%, oxygen in the amount of between 2% to 6%, and chlorine in the amount of between 30% to 60%. The second stage consists of the gradual pyrolysis of the passivated copolymer, with the aim of developing microporosity and high surface area values; as well as during the melting and gas dehydrohalogenation stages thereof, the deformation of the material is avoided. The morphology of the copolymers are microspheres of 125 to 225 micrometers, or cylinders of 4 mm in height and 3 mm in diameter, which after pyrolysis reduce its size by 35% with respect to the initial one. The material of the second stage, which is already microporous carbon material, presents in the layer percentages between 90% to 100% carbon and between 10% to 0% oxygen.

Another object of the present invention is to show that this microporous carbon material presents the highly feasible quality of effecting the chromatographic separation of nitrogen in mixtures with gases such as hydrogen sulfide, carbon dioxide, methane, and $C_2$, $C_3$, and $C_4^+$ hydrocarbons, which allows to take it as a base to develop technologies for the separation of these components through adsorption-desorption processes.

The above and other objects of the present invention will be established with greater clarity and detail in the following sections.

BRIEF DESCRIPTION OF THE DRAWINGS OF THE INVENTION

In order to have a greater understanding of the process of the present invention for the manufacture of microporous carbon material, reference will be made to the figures that are attached.

DETAILED DESCRIPTION OF THE INVENTION

The present invention relates to a process of manufacturing microporous carbon material consisting of two consecutive stages. The first stage consists of a surface passivation of copolymers of poly (vinylidene chloride) by chemical attack in a highly alkaline alcohol solution, with the objective to carry out a precarbonization on the surface of the copolymer, so that during the pyrolysis process the microporosity is not deformed, and developed gradually; the second stage consists in the gradual pyrolysis of the passivated copolymer, with the aim of developing high micro surface and surface area values; as well as during the melting and gas dehydrohalogenation stages thereof the deformation of the material is avoided.

Figure 1:
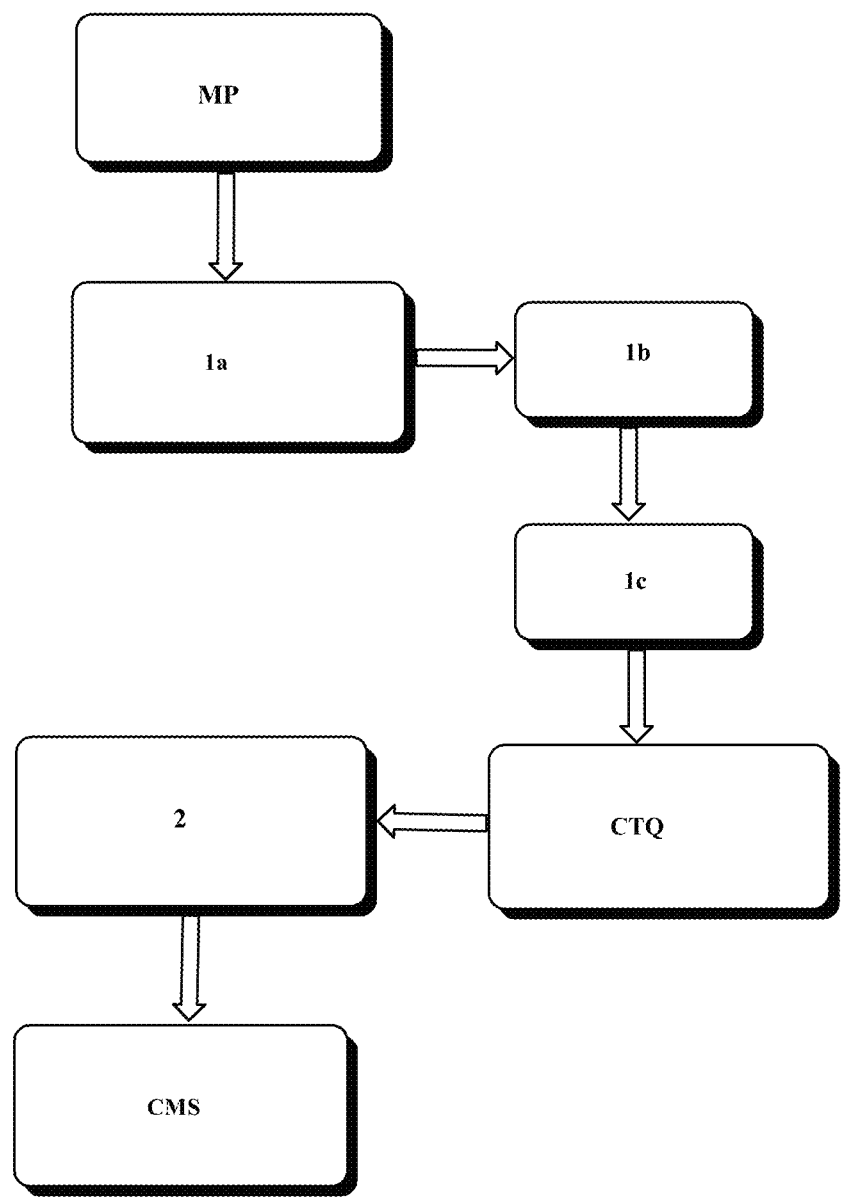
FIG. 1 shows a diagram of the process in two consecutive stages, for the manufacture of microporous carbon material of the present invention.

Thus, Step MP of FIG. 1 represents the starting materials being subjected to this technique, basically copolymers of polyvinylidene chloride (PVDC) with polyvinyl chloride (PVC) in the form of spheres 60 to 80 mesh, among which are the Saran XU of Dow Co, the Ixan of Solvay Co., the poly (vinylidene chloride-co-methyl acrylate), PVDC-AM, of Aldrich (430404) with density of 1.78 g/cm$^3$, poly (vinylidene chloride-co-vinyl chloride) from Aldrich (437107) with a density of 1.73 g/cm$^3$.

Stage 1a of FIG. 1 represents the beginning of the process of the present invention: precarbonization by chemical attack in liquid phase by means of an alkali hydroxide dissolved in an alcohol, which consists of reacting the copolymer with an alkaline hydroxide solution (preferably of potassium), in a $C_1$-$C_4$ alcohol (preferably iso-propyl alcohol) inside a reactor with mechanical stirring. The reaction conditions are: temperature from 15 to 80° C., preferably at 30° C., and time from 0.5 to 16 h, preferably from 3 to 7 h.

The material obtained in Step 1a is filtered and washed with distilled water 3 to 10 times for 60 min each at 20-90° C., preferably with 2 washes for 5-40 min each at 25° C. (Stage 1 b of the FIG. 1).

The material from Step 1b is dried in a vacuum oven for 6-18 h at 60-90° C., preferably 12-18 h at 70° C. (Step 1c of FIG. 1).

Stage CTQ in FIG. 1 represents the material resulting from the first stage, which is identified as Carbon from Chemical Treatment (CTQ).

Stage 2 in FIG. 1 represents the embodiment of the second stage of the process of the present invention, calcination at temperatures greater than 500° C. in an inert atmosphere. In this stage, the CTQ material of the first stage is subjected to calcining by pyrolysis in a tubular furnace inside a quartz tube and under an inert atmosphere of helium, argon, or nitrogen (preferably of helium), with flows of 30-100 cm$^3$/min at 500-1200° C. (preferably between 700 and 900° C.), by means of a controlled heating ramp at a heating rate of 5° C./min, for a time of 3 to 12 h (preferably of 6 h).

The CMS Step in FIG. 1 represents the final product of the process of the present invention, identified as Microporous Carbon (CMS) resulting from the second stage. Microporous Carbon retains the original form of the original material: extruded body microspheres with a uniform particle size distribution although smaller than that of the source material, in the form of 100 to 150 micrometer spheres.

In Table 1, examples of the SP-X materials prepared by the process of the present invention are described under different conditions of molar concentration (M) of potassium hydroxide; iso-propanol-$H_2O$ ratio (% volume); attack time chemical; and final density after the pyrolysis process.

TABLE 1

SP-X prototypes prepared according to Example 1.

| PROTOTYPES | QUANTITY OF RAW MATERIAL (g) | KOH (M) | ISOPROPANOL-$H_2O$ (% vol) | TIME CHEMICAL ATTACK (h) | BULK DENSITY (g/cm$^3$) |
|---|---|---|---|---|---|
| SP-X1 | 25 | 6.0 | 100 | 2 | 0.59 |
| SP-X2 | 25 | 6.0 | 100 | 16 | 0.49 |
| SP-X3 | 25 | 6.0 | 90 | 2 | 0.60 |
| SP-X4 | 25 | 6.0 | 60 | 2 | 0.63 |
| SP-X5 | 25 | 4.0 | 100 | 2 | 0.61 |
| SP-X6 | 25 | 4.0 | 100 | 16 | 0.50 |
| SP-X7 | 25 | 4.0 | 90 | 2 | 0.68 |
| SP-X8 | 25 | 4.0 | 60 | 2 | 0.54 |
| SP-X9 | 25 | 3.0 | 100 | 2 | 0.61 |
| SP-X10 | 25 | 3.0 | 100 | 16 | 0.49 |
| SP-X11 | 25 | 3.0 | 90 | 2 | 0.61 |
| SP-X12 | 25 | 3.0 | 60 | 2 | 0.57 |
| SP-X13 | 25 | 2.0 | 100 | 2 | 0.62 |
| SP-X14 | 25 | 2.0 | 100 | 16 | 0.58 |
| SP-X15 | 25 | 2.0 | 90 | 2 | 0.68 |
| SP-X16 | 25 | 2.0 | 60 | 2 | 0.59 |
| SP-X17 | 25 | 1.0 | 100 | 2 | 0.60 |
| SP-X18 | 25 | 1.0 | 90 | 16 | 0.59 |
| SP-X19 | 25 | 1.0 | 60 | 2 | 0.56 |
| SP-X20 | 25 | 1.0 | 100 | 2 | 0.67 |

According to the above in Example 1, the typical procedure for the preparation of the microporous carbon material motifs of this invention is described, and in Examples 2 and 3 the evaluation of its capacity for separation of nitrogen, methane, carbon dioxide, and hydrogen sulfide, and its quaternary mixture in these materials.

Example 1

Stage 1. Chemical Treatment
(Dehydrohalogenation)

Preparation of the Alcoholic Potassium Solution:

100 g of potassium hydroxide are weighed and introduced into a 2000 cm$^3$ reactor. 1000 cm$^3$ of the $C_2$-$C_4$ alcohol is added to the reactor with the caustic potash and stirred until the potash is completely dissolved at room temperature.

Dehydrohalogenation:

Saran XU copolymer from Dow Co. (40-60 mesh spheres) is weighed and added to the 2000 cm$^3$ reactor with the iso-propanol/potash solution. The mixture is stirred for 1-16 h, at 25° C. The dispersion turns dark brown to black. After the reaction, the mixture is decanted and vacuum filtered. The solid material is washed twice with two volumes of iso-propanol within the same funnel. The material is transferred to a 1000 cm$^3$ beaker, and 800 cm$^3$ of distilled water are added at 80° C. and stirred for 20 min. The dispersion is filtered with the aid of vacuum. The filtrate is dark brown in color and sent to alkaline aqueous waste. The operation requires at least 2-8 washes until the filtrate is crystalline, has neutral pH, and shows negative test with silver nitrate solution (Negative chloride test). The product obtained is dried in a vacuum oven at 70° C., for 16 h. The cold material is weighed and the apparent density is determined, which should be from 0.7 to 0.9 g/cm³, according to the standard technique ASTM D 2854. These materials is denoted as CTQX.

Stage 2. Thermal Treatment by Pyrolysis (in Tubular Furnace).

15 to 20 g of the CTQX material obtained in Step 1 is weighed and placed in a tubular quartz chamber, inside a tubular quartz jacket, and in turn inside a tubular furnace in the corresponding cavity. The flow of inert gas, helium of high purity, is measured at 100 cm³/s. A washing bottle (scrubber) with sodium hydroxide solution at 30% mass and external vent is adapted to the outlet of the oven. The material is subjected to heat treatment (700° C. for 6 h), using a ramp of 0.04 h for 100° C., 6 h for 100° C. at the calcination temperature (700-1100° C.), 6 h at the temperature of calcination and 4 h from the calcination temperature to cool to 100° C., and at room temperature at a heating rate of 5-15° C./min and cooling of 1-10° C./min. The material obtained with this treatment is denoted as SP-X X (see Table 1). Control tests are made of the developed process, making experimental measurements of material properties, such as bulk density (ASTM D 2854), physical appearance, BET surface area by adsorption-desorption of nitrogen at −196.15° C. (77K), and elemental analysis by energy dispersive spectrometry (EDS) in scanning electron microscopy, as described in Table 2.

As can be seen, the microporous carbon materials SP-X, example of this invention, have surface area values between 895 to 1170 m²/g, which are characteristic of microporous materials. The majority of the materials obtained by the described steps retains the initial spherical shape and presents a reduction in size from 10% to 45%. The percentage of carbon and oxygen in these materials ranges from 80-97% and 3-20% mass, respectively, which indicates the presence of oxygenated functions on the surface of the carbon material.

Figure 2:
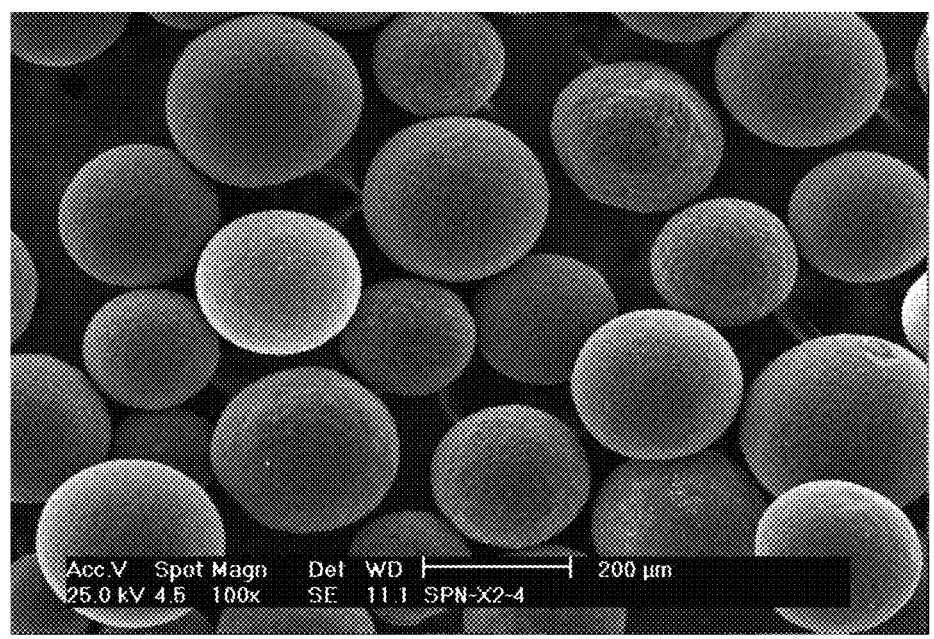
FIG. 2 shows the scanning electron microscopy micrograph of the carbon microporous material, showing the spherical shape of the particles.
Figure 3:
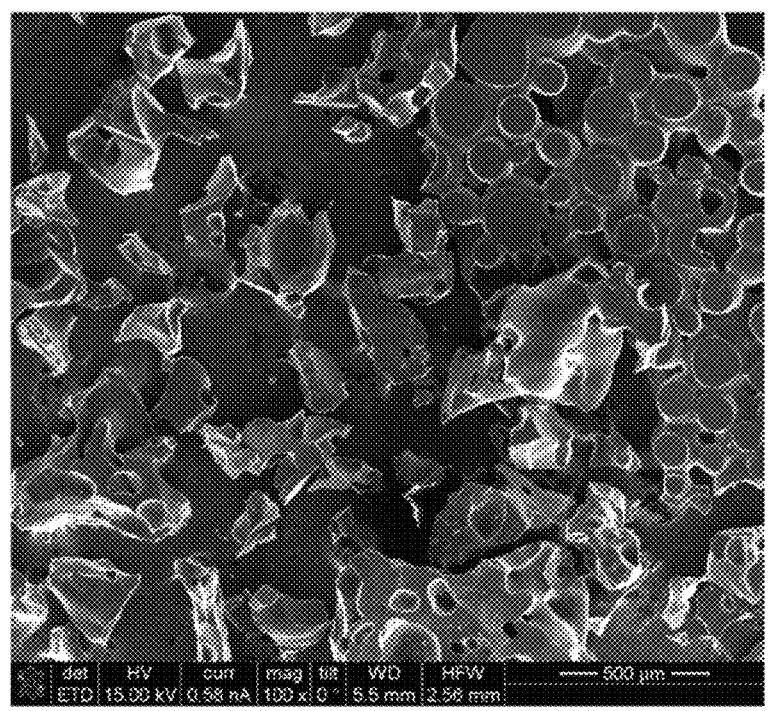
FIG. 3 shows the micrograph of scanning electron microscopy of the microporous carbon material prepared by direct calcination by pyrolysis of the polyvinylidene copolymer, which has irregular shape and size.

FIGS. 2 and 3 show a scanning electron microscopy micrograph of some of the SP-X CMS materials obtained by the process of the present invention, where the spherical shape of the particles FIG. 2 is shown in comparison with that prepared by calcination direct by pyrolysis of the polyvinylidene copolymer, which has irregular shape and size (FIG. 3).

TABLE 2

Values of surface area, morphology and carbon and oxygen content obtained in the characterization of the various SP-X prototypes.

| PROTOTYPE | SURFACE AREA (m²/g) | Carbon (% mass) | Oxygen (% mass) | Morphology |
|---|---|---|---|---|
| SP-X1 | 1,099.31 | 82 | 18 | microspheres |
| SP-X2 | 958.28 | 80 | 20 | microspheres |
| SP-X3 | 1,135.01 | 83 | 17 | microspheres |
| SP-X4 | 1,147.12 | 97 | 3 | amorphous |
| SP-X5 | 1,171.27 | 90 | 10 | microspheres |
| SP-X6 | 1,018.62 | 89 | 11 | microspheres |
| SP-X7 | 1,162.75 | 92 | 8 | microspheres |
| SP-X8 | 1,166.47 | 90 | 10 | amorphous |
| SP-X9 | 1,140.36 | 90 | 10 | microspheres |
| SP-X10 | 895.55 | 84 | 16 | microspheres |
| SP-X11 | 1,165.64 | 84 | 16 | microspheres |
| SP-X12 | 1,158.88 | 84 | 16 | amorphous |
| SP-X13 | 1,160.82 | 95 | 5 | microspheres |
| SP-X14 | 1,013.47 | 94 | 6 | microspheres |
| SP-X15 | 1,116.32 | 95 | 5 | amorphous |
| SP-X16 | 1,055.74 | 97 | 3 | amorphous |
| SP-X17 | 1,154.08 | 96 | 4 | amorphous |
| SP-X18 | 1,143.15 | 94 | 6 | amorphous |
| SP-X19 | 1,131.18 | 94 | 6 | amorphous |
| SP-X20 | 1,142.52 | 95 | 5 | amorphous |

Example 2

The microporous carbon materials obtained with the technique described in EXAMPLE 1 (Table 1), were evaluated with the objective of measuring the efficiency of nitrogen separation in binary mixtures of nitrogen-methane, nitrogen-carbon dioxide, and nitrogen-acid hydrogen sulfide, by gas chromatography. This was done using a methodology based on the inverse gas chromatography technique, in which the adsorbent material is the subject of analysis, and gases such as nitrogen, methane, carbon dioxide, and hydrogen sulfide are the reference molecules. The test consists of placing a sample of adsorbent material of known mass (about 0.7 g) inside a stainless steel column 50 cm long by 0.1 cm internal diameter. Prior to the separation test, the packed column is installed in the chromatograph with a thermal conductivity detector and conditioned at 200° C. with a soft flow at 10 cm³/min of helium for 3 h. Once the conditioning is finished, the chromatograph oven is cooled. Then the evaluation of the separation of the gas mixture by the packed column is carried out using the following conditions: helium carrier gas with flow of 15 cm³/min, gas flow to be tested in the adsorbent of 35 cm³/min, injector temperature of 100° C., and detector temperature of 220° C.; the adsorption is carried out in the temperature range of 20–45° C. and with a pressure range of 2-15 kg/cm²; and the desorption is carried out with a temperature of 135-250° C. and at reduced pressure up to atmospheric pressure. A typical example of the chromatographic program is indicated in Table 3.

Once the program is established, 5 μL of a test sample is injected through a gas syringe, the composition of which is preferably equal parts by mass of the following gases: nitrogen, methane, carbon dioxide, and hydrogen sulfide. Once the chromatogram is obtained, the retention times are recorded, and with this data the Retention Factor FR is calculated, which is the ratio between the retention time ($T_{R1}$) of the gas with the lowest value in the time scale and the $T_{R2}$ of the gas with greater value. The microporous carbon material evaluated that presents smaller $F_R$ values are considered the most selective for the separation of the components of the mixture and consequently, to separate the nitrogen more efficiently. The equation to determine the Retention Factor is described below:

$$F_R = \frac{t_{R1}}{t_{R2}} \quad t_{R2} > t_{R1}$$

TABLE 3

Program for the heating ramp used in the gas chromatography.

| Stage | Heating rate (° C./min) | Temperature (° C.) | Time (min) |
|---|---|---|---|
| 1 |  | 35 | 20 |
| 2 | 25 | 135 | 1 |
| 3 | 40 | 175 | 7 |
| 4 | 70 | 200 | 15 |

Figure 4:
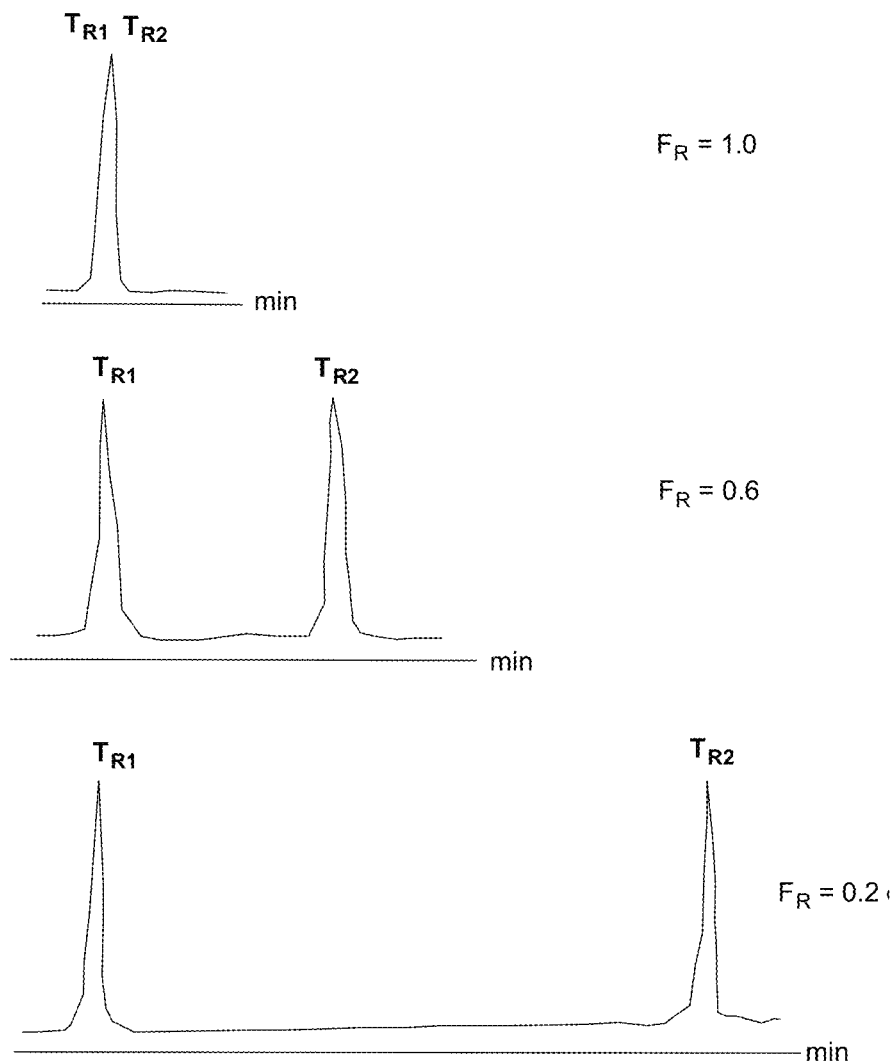
FIG. 4 shows a diagram where the interpretation that is performed according to the injection of the binary gas mixture is presented graphically, wherein in $F_R=1$, there is no separation, $F_R=0.6$, there is little separation, and $F_R=0.2$ or less, there is a high separation.

In FIG. 4, the interpretation that must be performed according to the injection of a binary gas mixture is presented graphically.

Table 4 shows the results obtained for SP-X materials, prepared according to Example 1. In the same table, the $T_R$ of $CO_2$ and $H_2S$ are described, as long as these were desorbed from the microporous carbon material at 30° C. The microporous carbon materials evaluated that do not present values in the Table means that the desorption occurs at temperatures higher than 175° C.

TABLE 4

Retention time values ($T_R$) and retention factors ($F_R$) for the separation of binary mixtures of nitrogen-methane, nitrogen-carbon dioxide and nitrogen-hydrogen sulfide, by means of inverse gas chromatography, at 30° C.

| PROTOTYPE | SEPARATION $N_2$—$CH_4$ $F_R$ | $T_R$ $CO_2$ | $T_R$ $H_2S$ |
|---|---|---|---|
| SP-X1 | 0.210 | 33.08 | 32.60 |
| SP-X2 | 0.223 | — | — |
| SP-X3 | 0.201 | 19.20 | — |
| SP-X4 | 0.180 | — | — |
| SP-X5 | 0.200 | 15.83 | — |
| SP-X6 | 0.209 | — | — |
| SP-X7 | 0.198 | 22.12 | — |
| SP-X8 | 0.194 | 23.36 | 24.26 |
| SP-X9 | 0.210 | 17.08 | 23.89 |
| SP-X10 | 0.225 | — | — |
| SP-X11 | 0.197 | 18.01 | 18.01 |
| SP-X12 | 0.211 | 14.16 | 14.63 |
| SP-X13 | 0.209 | 12.64 | 12.89 |
| SP-X14 | 0.212 | — | — |
| SP-X15 | 0.193 | — | — |
| SP-X16 | 0.194 | — | — |
| SP-X17 | 0.196 | — | — |
| SP-X18 | 0.194 | — | — |
| SP-X19 | 0.201 | — | — |
| SP-X20 | 0.184 | — | — |

Example 3

Figure 5:
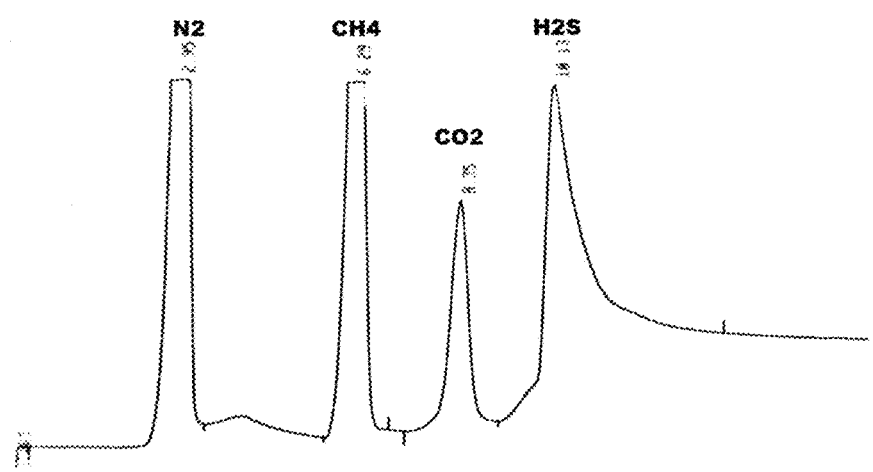
FIG. 5 shows the chromatogram for the separation of a mixture of $N_2$, $CH_4$, $CO_2$ and $H_2S$ in the SP-X carbon molecular sieve type material.

The microporous carbon materials obtained with the technique described in EXAMPLE 1 (Table 1), were evaluated with the objective of measuring the efficiency of nitrogen separation in quaternary mixtures of nitrogen-methane-carbon dioxide and hydrogen sulfide, by means of chromatography of gases according to the technique described in EXAMPLE 2. The chromatogram shown in FIG. 5 describes that the separation is feasible when using as stationary phase the carbon molecular mesh SP-X prepared in EXAMPLE 1. The values of $T_R$ (min) they are 2.95 for nitrogen, 6.29 for methane, 8.35 for carbon dioxide, and 10.13 for hydrogen sulfide.

According to these results, it is possible to say that the microporous carbon materials prepared with this technique present an efficient separation of the nitrogen-methane mixture. In addition, it can remove highly efficient mixtures of nitrogen and carbon dioxide as well as nitrogen-hydrogen sulfide. Some of the microporous carbon materials prepared in this invention retain, in a very important way, carbon dioxide and hydrogen sulfide, requiring the material to be subjected to high temperatures for the desorption thereof, while in other prepared materials they are separated and desorbed at temperatures below 175° C. It should be noted that microporous carbon materials prepared whose chemical attack was carried out at concentrations of 3 to 5 M are those that effect the separation and desorption of carbon dioxide and hydrogen sulfide at temperatures below 175° C.

Figure 6:
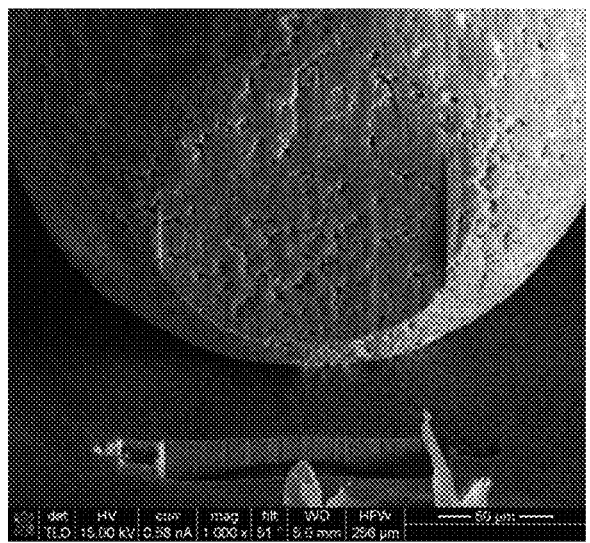
FIG. 6 shows the micrograph of scanning electron microscopy for the microsphere of the PVDC (Polyvinylidene chloride) copolymer; the elemental composition obtained by EDS shows a cross section and chemical analysis of both the surface and the interior is as follows: External wall: 56.89% carbon, 5.37% oxygen, 37.73% chlorine, and Internal wall: 55.80% carbon, 3.32% oxygen, and 40.88% chlorine.
Figure 7:
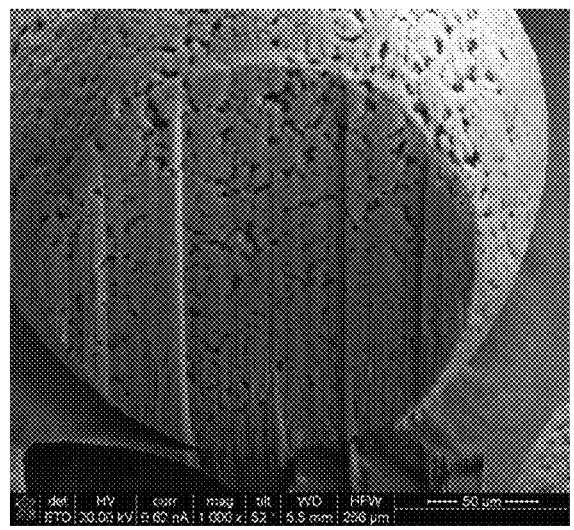
FIG. 7 shows the scanning electron microscopy for the microsphere the passive CTQ copolymer (chemically treated carbon), the elemental composition obtained by EDS; a cross section is shown and the chemical analysis of both the surface and of the interior is as follows: External wall: 69.62% carbon, 11.90% oxygen, 19.48% chlorine, and Internal wall: 50.80% carbon, 4.56% oxygen, and 44.64% chlorine.
Figure 8:
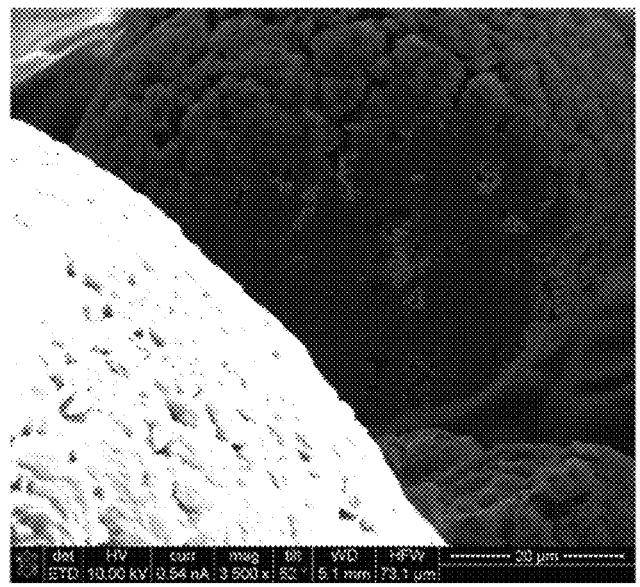
FIG. 8 shows the scanning electron microscopy for the microporous carbon material SP-X, the elemental composition obtained by EDS; and the chemical analysis of both the surface and the interior is as follows: External wall: 84.0% carbon, 16.0% oxygen, and Internal wall: 84.0% carbon, 16.0% oxygen.

Another relevant aspect of the present invention is that the material resulting from this process essentially retains the shape of the starting copolymer, with a slight decrease in size, which means a considerable saving in material losses if it is carried out by other treatments necessary to confer it to the product a homogeneous shape and size, which generates a technical advantage over the preparations through the process of calcination by direct pyrolysis. It should also be noted that with the procedure described in this invention and depending on the molar concentration of the base, activation can be generated by introduction of oxygenated groups on the surface of the material, according to the results set forth in Table 2. With this procedure, by passivating the surface of the PVDC-AM copolymer, the percentage of carbon can be increased with respect to the original, reducing the amount of chlorine, causing that during the pyrolysis stage the evolution of the gases is more controlled, avoiding deformations in the final carbon microporous material. FIG. 2 shows the morphology obtained by the method described in this invention, and FIG. 3 shows the morphology obtained with the direct pyrolysis without the chemical treatment described in this document. FIGS. 6, 7, and 8 show the gradual changes in the elemental composition, obtained by EDS in the scanning electron microscopy, for the copolymer of PVDC-AM SX in FIG. 6, the same material passivated with the chemical treatment described here in FIG. 7, and the final SP-X carbon microporous material in FIG. 8. Taking into consideration the methodology of Example 2, which consists in the determination of the chromatographic separation in gas phase with a column packed with the SP-X material, if a quaternary mixture of nitrogen-methane-carbon dioxide-hydrogen sulfide is injected, the obtained chromatographic profile is shown in FIG. 4, a result that is extendable for the use of these subject matter materials of the present invention, in the separation of the components of natural gas, including high concentrations of nitrogen.

The invention claimed is:

1. A process for the preparation of a microporous carbon material from pyrolysis of microspheres of a poly (vinylidene chloride) copolymer that have been chemically treated with alkali or alkaline earth metal hydroxides or alkoxides, comprising:
    carrying out a first heating of the microspheres at a rate of 0.25° C./min to 1.75° C./min to a temperature of between 700° C. to 1200° C., and a second heating of the microspheres for 300 min to 1200 min to a temperature of between 700° C. to 1200° C.; and
    carrying out a cooling of the microspheres at a rate of 0.25° C./min to 1.75° C./min;
    wherein the resulting microporous carbon materials have a carbon content in the microsphere shell of 80% to 97% by mass, and wherein the microporous carbon material has oxygen in the microsphere shell.

2. A process according to claim 1, wherein, prior to the pyrolysis, the poly (vinylidene chloride) copolymers are chemically treated by dispersing the copolymers in a solution of alkali or alkaline earth metal hydroxides or alcohol oxides, wherein the solution contains NaOH, KOH, LiOH, $Mg(OH)_2$ or $Ca(OH)_2$ or sodium methoxide, potassium methoxide, potassium iso-propoxide, sodium iso-propoxide, lithium iso-propoxide or potassium tert-butoxide, sodium tert-butoxide with oxygenated solvents, preferably water, methanol, ethanol, n-propanol, iso-propanol, n-butanol, sec-butanol, tert-butanol and mixtures thereof, and subsequently stirring the copolymers in a batch reactor.

3. A process according to claim 2, wherein the chemical treatment of the poly (vinylidene chloride) copolymers uses a 0.5% to 45% by mass ratio of the alcohol or the hydroxide in the oxygenated solvent and mixtures thereof, and wherein the solvent and mixtures thereof are prepared in proportions of 1:99 to 99:1 volume.

4. A process according to claim 3, wherein during the chemical treatment of poly (vinylidene chloride) copolymers, stirring is provided between 50 rpm to 500 rpm, at a constant temperature of 20° C. to 70° C., with time of duration from 0.1 h to 60 h.

5. A process according to claim 4, wherein the copolymer chemically treated and subjected to pyrolysis presents, in a layer, percentages of carbon between 55% to 85%, oxygen between 5% to 20%, and chlorine between 10% to 40$, and inside the material presents, in a layer, carbon percentages between 30% to 65%, oxygen between 2% to 6%, and chlorine between 30 to 60%.

6. A process according to claim 5, wherein the copolymer chemically treated and subjected to pyrolysis does not show changes in the morphology thereof before, during, and after the pyrolysis, but showing a reduction in size of 50%.

7. A method of using microporous carbon materials prepared according to the process of claim 1, wherein said use comprises:
separating and desorbing mixtures of nitrogen with hydrocarbons $C_1$, $C_2$, $C_3$ and $C_4^+$, with adsorption of the latter using adsorption conditions in a temperature range of 20° C. to 45° C. and with a pressure range of 2 $kg/cm^2$ to 15 $kg/cm^2$;
wherein the desorption conditions are in a temperature range of 135° C. to 250° C. and at reduced pressure to atmospheric pressure; and
the microporous carbon materials have a carbon content in the microsphere shell of between 80% to 97% by mass and oxygen in the microsphere shell.

8. A method of using microporous carbon materials prepared according to the process of claim 1, wherein said use comprises:
separating and desorbing mixtures of nitrogen with carbon dioxide and hydrogen sulfide, at temperatures between 175° C.;
wherein the microporous carbon materials have a carbon content in the microsphere shell of between 80% to 97% by mass and oxygen in the microsphere shell.

9. A method of using microporous carbon materials prepared according to the process of claim 1, wherein said use comprises:
retaining carbon dioxide and hydrogen sulfide by subjecting the microporous carbon materials to temperatures below 175° C. for the desorption thereof;
wherein the microporous carbon materials have a carbon content in the microsphere shell of between 80% to 97% by mass and oxygen in the microsphere shell.

10. The method of using microporous carbon materials according to claim 7, wherein the use is conducted for separating nitrogen in gas streams, said gas streams comprising natural gas, associated natural gas, and biogas.

11. A process of manufacturing microporous carbon material, comprising:
first and second consecutive stages;
the first stage including the step of passivation of a surface of at least one copolymer of poly(vinylidene chloride) by chemical attack in an alkaline alcohol solution that includes an alkali hydroxide dissolved in an alcohol, to cause formation of a surface-passivated copolymer having precarbonization on the surface;
the second stage including the step of pyrolysis of the surface-passivated copolymer to increase a surface area of the surface-passivated copolymer;
wherein the chemical attack is performed by reacting the at least one copolymer of poly(vinylidene chloride) with the alkali hydroxide dissolved in the alcohol.

12. The process of claim 11, wherein the at least one copolymer of polyvinyl chloride is provided in the form of spheres.

13. The process of claim 12, wherein the spheres have a size of about 60 to about 80 mesh.

14. The process of claim 11, wherein the alkali hydroxide is selected from the group consisting of NaOH, KOH, LiOH, $Mg(OH)_2$, $Ca(OH)_2$, sodium methoxide, potassium methoxide, potassium iso-propoxide, sodium iso-propoxide, lithium iso-propoxide, potassium tert-butoxide, sodium tert-butoxide, and combinations thereof, by using about 0.5% to about 45% by mass ratio of the hydroxide in the oxygenated solvent and mixtures thereof.

15. The process of claim 11, wherein the alcohol is selected from the group consisting of methanol, ethanol, n-propanol, iso-propanol, n-butanol, sec-butanol, tert-butanol, water and mixtures thereof, and wherein the solvent and mixtures thereof are prepared in proportions of 1:99 to 99:1 volume.

16. The process of claim 11, wherein the stirring is provided between about 50 rpm to about 500 rpm, at a constant temperature of about 20° C. to about 70° C., with time of duration from about 0.1 h to about 60 h.

17. The process of claim 11, wherein the first stage further comprises the step of washing with alcohol-water blends of the surface-passivated copolymer between about three and about ten times at a temperature of about 20 to about 90° C.

18. The process of claim 16, wherein the first stage further comprises the step of drying the surface-passivated copolymer for about 6 to about 18 hours at a temperature of about 60 to about 90° C.

19. The process of claim 11, wherein the second stage further comprises the step of calcining the pyrolyzed surface-passivated copolymer in an inert atmosphere at a temperature of about 500 to about 1200° C.

20. The process of claim 18, wherein the calcining is performed in a tubular furnace at a flow rate of about 30 to about 100 cm 3 per minute.

21. The process of claim 11, wherein the second stage yields microporous carbon spheres having diameters of about 100 to about 150 micrometers.

\* \* \* \* \*